United States Patent [19]

Förster et al.

[11] Patent Number: 4,988,290
[45] Date of Patent: Jan. 29, 1991

[54] COMBUSTION SPACE WITH A CERAMIC LINING SUCH AS IN THE COMBUSTION CHAMBER OF AN INTERNAL COMBUSTION ENGINE OR THE COMBUSTION SPACE IN A ROTARY KILN FURNACE

[75] Inventors: Siegfried Förster, Alsdorf; Peter Quell, Aachen, both of Fed. Rep. of Germany

[73] Assignee: Forschungszentrum Jülich GmbH, Jülich, Fed. Rep. of Germany

[21] Appl. No.: 379,014

[22] Filed: Jul. 12, 1989

[30] Foreign Application Priority Data

Jul. 12, 1988 [DE] Fed. Rep. of Germany ....... 3823510

[51] Int. Cl.$^5$ .................................................. F27B 7/00
[52] U.S. Cl. ..................................... 432/103; 432/118; 432/119
[58] Field of Search ............... 432/114, 118, 119, 110, 432/103

[56] References Cited

U.S. PATENT DOCUMENTS

| 1,647,083 | 10/1927 | Croll | 432/119 |
| 3,175,815 | 3/1965 | Wicken et al. | 432/119 |
| 4,340,360 | 7/1982 | Hoedl et al. | 432/119 |
| 4,341,514 | 7/1982 | Shanks | 432/119 |
| 4,422,848 | 12/1983 | Musil | 432/118 |

FOREIGN PATENT DOCUMENTS 1037033 8/1983 U.S.S.R. ............................. 432/119

Primary Examiner—Henry C. Yuen
Attorney, Agent, or Firm—Nils H. Ljungman & Associates

[57] ABSTRACT

An internal combustion engine having combustion chambers with ceramic linings. These ceramic linings have webs between inner and outer surfaces for forming sealed cavities therein.

12 Claims, 3 Drawing Sheets

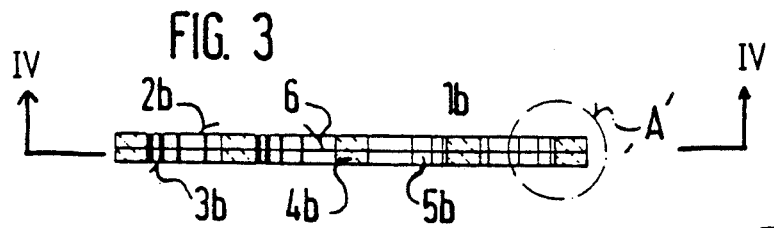
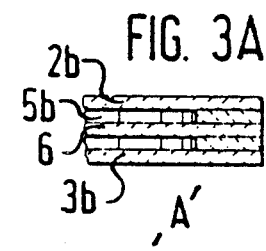
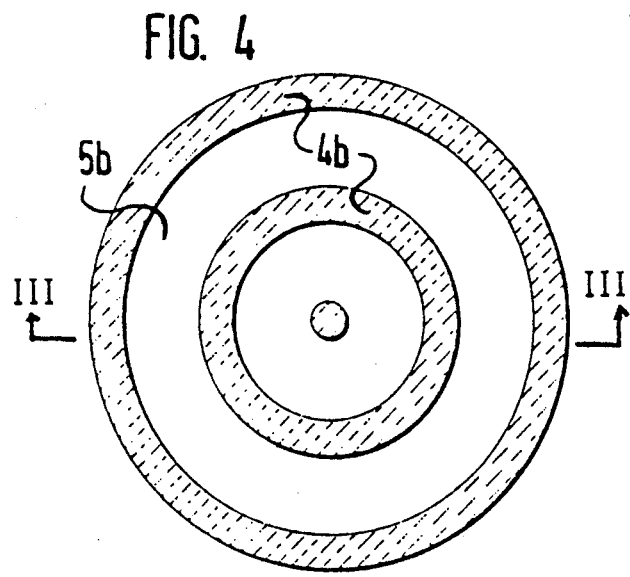
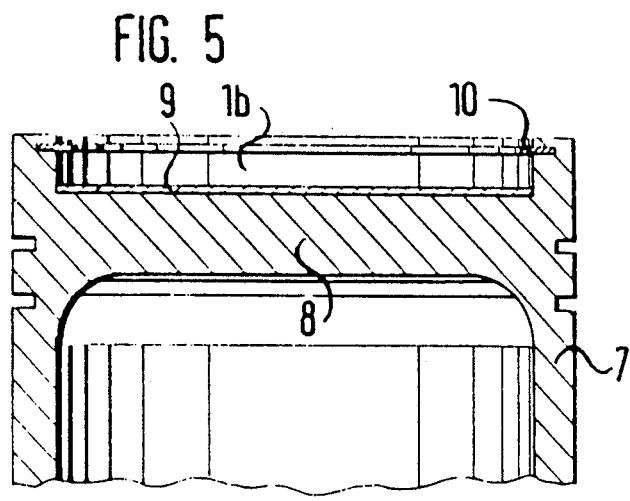

COMBUSTION SPACE WITH A CERAMIC LINING SUCH AS IN THE COMBUSTION CHAMBER OF AN INTERNAL COMBUSTION ENGINE OR THE COMBUSTION SPACE IN A ROTARY KILN FURNACE

BACKGROUND OF THE INVENTION

1. Field of the Invention

This invention relates to a ceramic lining for a combustion space such as the combustion chamber of an internal combustion engine or the combustion space in a rotary kiln furnace. The lining has cavities between its inner and outer wall.

2. Description of the Prior Art

Combustion space linings made of ceramic material are used both for combustion spaces and for combustion chambers of internal combustion engines. They are used to provide thermal insulation between the hot combustion space and the metal walls surrounding it. For this purpose, the linings are designed to be compact and completely cover the metal walls. A disadvantage is that a temperature gradient occurs from the combustion space toward the surface of the lining, which leads to the depositing of heavy components of the fuels used and to the precipitation of cracking products on the lining, which are then carbonized at low temperatures on the lining into layers of soot. Undesired carbon monoxide is also produced during combustion at the wall temperatures in question, which are below 600° C.

Such combustion conditions occur, in particular, in combustion spaces and combustion chambers during the starting phase. The higher the thermal conductivity of the lining, the greater the danger of the formation of deposits on the ceramic linings, since in this case there is a rapid temperature equalization with the metal walls of combustion spaces and combustion chambers.

The prior art also includes ways to reduce the thermal conductivity by placing cavities in the lining (See "Motortechnische Zeitschrift" [MTZ] 47, 1986, page 495 ff.). However, this lining of the prior art made of highly refractory material takes up a considerable amount of space on account of its cavities and flux paths. To withstand the high pressures which are experienced in the combustion chamber of an internal combustion engine, structural requirements are set which are very difficult to fulfill with ceramic materials.

OBJECT OF THE INVENTION

The object of the invention is to provide a ceramic lining which has a high thermal insulation action, and which takes up little space, whereby the formation of deposits of fuel ingredients or cracked products thereof can be reduced or preferably substantially prevented during operation and during the starting phase of the internal combustion engine in which such linings are used. Finally, these linings should still have a simple structure.

SUMMARY OF THE INVENTION

This object is accomplished by the invention for a lining of the type indicated above, by an embodiment in which the lining has an inner wall with a low thermal capacity which is supported on the outer wall of the lining by means of supports which are sized according to the pressure prevailing in the combustion space. The low thermal capacity is primarily the result of cavities between the thin inner wall and outer wall, which lead to very rapid heating and adjustment of the inner wall to the temperature in the combustion space. In a very short time after ignition of the fuel mixture in the combustion chamber, the inner wall also reaches a temperature which is so high that the combustion also includes the fuel on the walls or in proximity to the walls. The supports, sized according to the pressure in the combustion chamber, also lead to a thermal dissipation which is preferably reduced to a minimum. Therefore, there is a structure, which may even include a heat sink, in the inner wall which promotes the desired rapid heating of the inner wall in the starting phase.

To reduce, or in some instances substantially to eliminate thermal stresses, the ceramic lining is preferably embedded in ceramic fiber material. This arrangement is appropriate for ceramic linings on the flat or even other walls of the combustion chamber of an internal combustion engine, in particular, where a ceramic lining is used in piston bottoms or tops adjacent to the combustion chamber and in the cylinder head of a piston engine. In the latter case, in addition to the thermal stresses, dynamic pressure loads can also be absorbed. It is appropriate in some embodiments to mount the ceramic lining on non-positive mountings. The resultant thermal strains transverse to the support plane of the mountings can then be absorbed without causing undue stresses.

Thermal strains may in an alternative embodiment most appropriately be absorbed by thermal expansion joints in the inner wall.

When there is high gas pressure in the combustion chamber, in particular, in combustion chambers of piston engines, the cavities are preferably sealed gas-tight.

In yet another alternative embodiment, it is advantageous to make the lining from ceramic tubes located next to one another. In this alternative embodiment of the lining, a low thermal dissipation is achieved, because direct, thermally-conducting contact between the lining and the metal or ceramic jacket of the combustion chamber or combustion space is preferably restricted practically to the linear contact between the tubes and the jacket. In the embodiment where ceramic tubes are used, a smooth inner wall, seen from the combustion chamber side, can be achieved by thin-walled covers of the tubes on their tube sides facing the combustion chamber.

BRIEF DESCRIPTION OF THE DRAWINGS

The invention is explained in greater detail below on the basis of the following embodiments. In the accompanying drawings:

FIG. 3 shows a lining with a partition, in cross section along line III/III in FIG. 4;

FIG. 3A shows a detail of part of FIG. 3;

FIG. 4 shows a lining with a partition, in cross section along line IV/IV in FIG. 3;

FIG. 5 shows a lining with a partition inside a piston floor;

DESCRIPTION OF THE PREFERRED EMBODIMENTS

Figure 1:
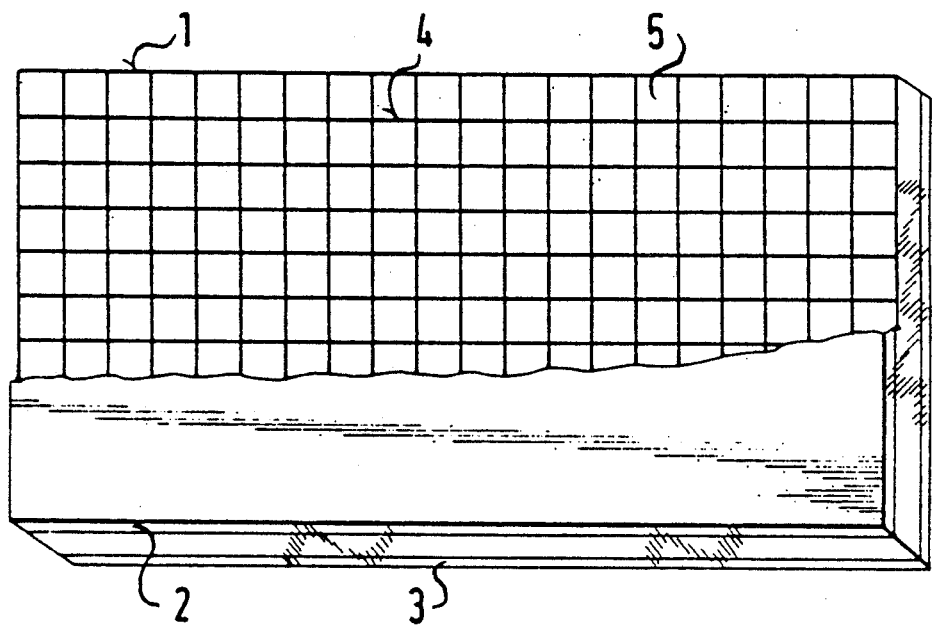
FIG. 1 shows a lining with a web structure.

FIG. 1 shows, in perspective, a ceramic lining 1 with a web-shaped structure. Between the inner wall 2 and the outer wall 3 of the lining, there is a grid-like support 4, which can be seen in FIG. 1 in a partial cross section with part of the inner wall 2 removed. Between the grid props of the support 4, there are cavities 5. The inner wall 2 is sized, in thickness and other dimensions, so that it can be heated in a short period of time. It is designed to be as thin as possible, to give it a low thermal capacity. The supporting portions of the support 4 are narrow and thin-walled, so that the thermal dissipation from the inner wall remains low. The mesh width of the grid props and other dimensions of the cavities supporting the inner wall 2 on the outer wall 3 are selected as a function of the working and peak pressure in the combustion chamber for which thermal insulation is being provided.

Figure 2:
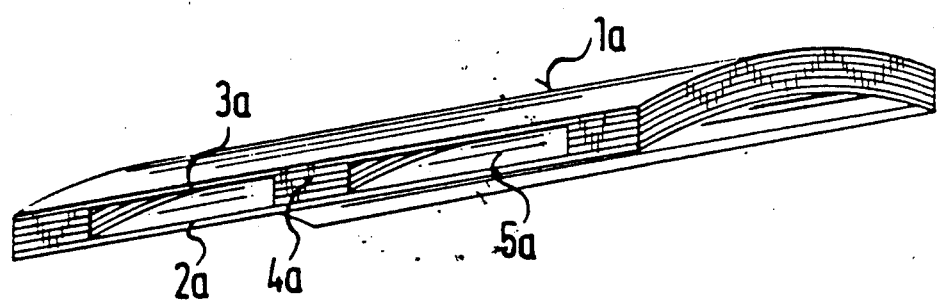
FIG. 2 shows a lining with a sandwich structure.

FIG. 2 shows a lining 1a, which is curved like an arch. The lining comprises thin ceramic layers, preferably connected to one another by sintering, whereby a thin inner wall 2a is connected to an outer wall 3a by means of supports 4a, which are configured from ceramic strips layered on top of one another. Between the supports 4a there are cavities 5a covered by the inner wall 2a and the outer wall 3a. The superimposed ceramic strips reduce the thermal conductivity in the supports 4a between the inner wall 2a and the outer wall 3a.

FIGS. 3 and 4 show a ring-shaped lining 1b with an intermediate layer 6. This layer 6 may in some embodiments be equidistant from the inner and outer walls 2b and 3b. This lining 1b also includes ceramic layers sintered to one another such as shown in FIG. 2. Between the inner and outer wall 2b, 3b and the intermediate layer 6, cavities 5b are formed by supports 4b between the walls, which cavities are closed on the outside as shown in FIG. 3A. The supports 4b are preferably located between the inner and outer wall and the intermediate layer and aligned with one another.

FIG. 5 shows a piston 7 of a piston engine, in the, for example, the top of the piston 8 of which a lining 1b has been installed, as illustrated in FIGS. 3 and 4. The lining 1b is embedded in the piston top 8 in ceramic fiber material 9 and held in a non-positive or flexible manner in the piston 7 by means of, for example, a Seeger circular clip ring 10. The lining 1b is located on the side of the piston top 8 facing the combustion chamber, and thus reduces the dissipation of the heat formed in the combustion chamber into the metal piston. The lining is sized according to the pressure which occurs in the combustion chamber. An important factor for the stability of the lining is the distance between and thickness of the supports 4b. The layered structure of the supports thereby leads to a low thermal conductivity.

Figure 6:
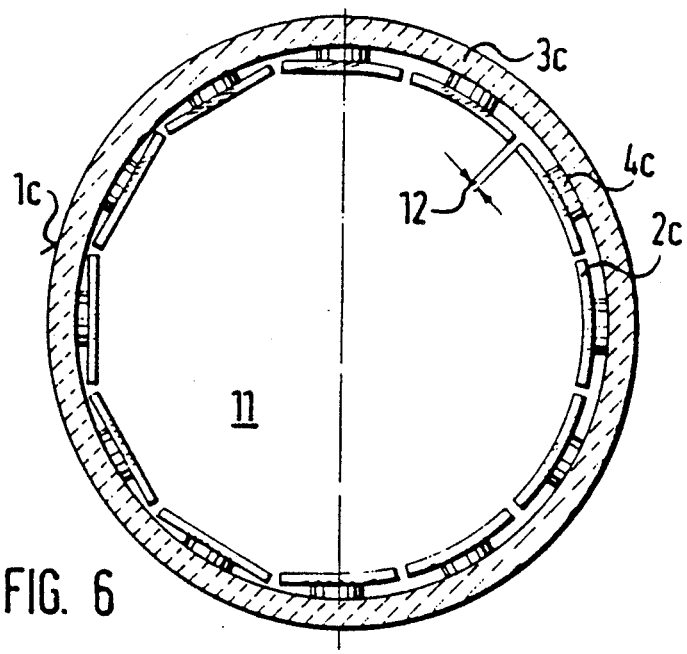
FIG. 6 shows the lining of a combustion chamber.

FIG. 6 shows a ceramic lining 1c for the combustion space 11 of a combustion chamber, such as, one which usually operates at atmospheric pressure, for example, in a rotary kiln furnace. The lining has an inner wall 2c with thermal expansion joints 12, which run axially in the cylindrical combustion chamber preferably down the rotary kiln walls. The inner wall segments formed in this manner are held by supports 4c on the outer wall 3c of the lining 1c.

Figure 7:
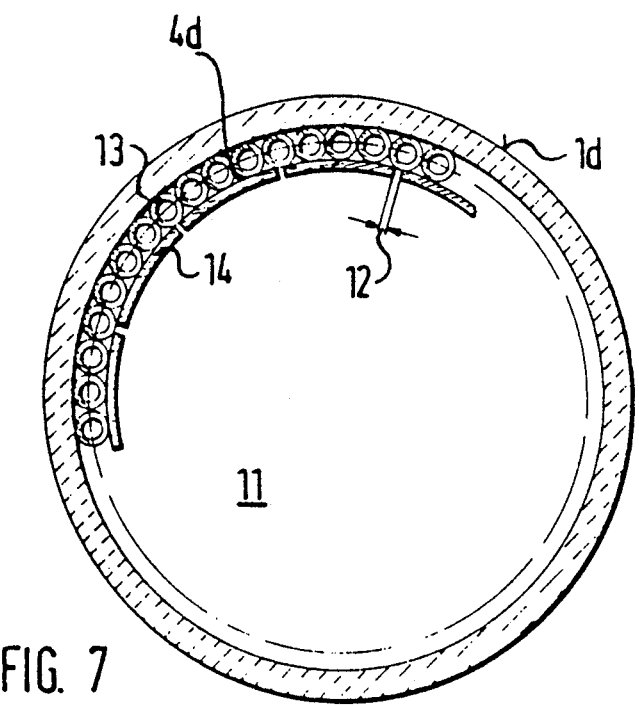
FIG. 7 shows a combustion chamber lining including ceramic tubes.

Another ceramic lining 1d for a combustion space, such as one in a rotary kiln furnace, is illustrated in FIG. 7. The lining 1d includes tubes 13 located next to one another, which have thin covers 14 facing the combustion space. The covers 14 accelerate the initial heating of the inner wall of the combustion space and thereby decrease the incomplete combustion reactions which typically occur on the surfaces of the combustion chamber during the starting phase.

In the embodiment illustrated in FIG. 7, thermal expansion joints 12 are installed so that the path of the joints and the path of the tubes 13 overlap, and cavities 4d do not remain open between covers 14 and tubes 13 toward the combustion space.

In all the embodiments, the inner walls of the linings preferably have low thermal capacities, which make possible a rapid heating of the inner walls and an adjustment of their temperature to a temperature related to the temperature prevailing in the combustion space. The linings are made from appropriate material and are sized so that the inner walls thereof reach the temperature required for the complete combustion of the fuels, at least on their surfaces, typically in a few seconds, such as 1-3 seconds, after the initiation of combustion. The inner walls become red hot after a short time. With the prior art, it typically took approximately ten times longer to reach sufficiently high wall temperatures in combustion chambers with simple ceramic insulation after the burners were fired up, and it was virtually impossible in many applications to reach sufficiently high temperatures on cylinder walls in combustion chambers of piston engines.

The supports of the linings for combustion chambers of piston engines are sized so that a sufficient strength of the lining in combustion chambers is assured up to combustion gas pressures of more than 50 atm.

In summing up, an embodiment of the invention resides in a ceramic thermal insulation lining for a combustion space, with cavities in the lining and with an inner wall having a low thermal capacity adjacent to the combustion space, and with supports for the lining, characterized by the fact that supports 4 of the inner wall 2 form boundaries for cavities 5 between the inner wall 2 and outer wall 3, whereby the cavities 5 are at least partly covered by the inner wall 2. The cavities 5, 5a, 5b are closed gas-tight facing the combustion space. The supports 4 are web-shaped. Between the outer wall 3b and inner wall 2b there is a partition 6, which, to form cavities 5b, is at some distance from the outer wall 3b and the inner wall 2b. There are supports 4b aligned with one another between the inner wall 2b and the partition 6, and between the partition 6 and the outer wall 3b. The lining 1a, 1b is in a sandwich configuration. The lining 1b is embedded in ceramic fiber material 9. The lining 1b is mounted on non-positive mountings 10. The inner wall 2c has thermal expansion joints 12. The lining 1d consists of ceramic tubes 13 located next to one another. The tubes 13 have thin-walled covers 14 toward the combustion space 11.

Some examples of materials and structures which may be usable in the above-described embodiments of the invention are as follows: U.S. Pat. No. 4,649,806, entitled "Composite Ceramic/Metal Piston Assembly and Method of Making"; U.S. Pat. No. 4,245,611, entitled "Ceramic Insulated Engine Pistons"; U.S. Pat. No. 4,796,517, entitled "Metal Piston and Ceramic Piston Pin Assembly"; U.S. Pat. No. 4,751,871, entitled "Multisectional Piston with Plural Ceramic Parts and Rigidly Connected Piston Rod for Use in Horizontally Opposed Piston Internal Combustion Engine"; U.S. Pat. No.

4,742,759, entitled "Ceramic Insert Cast Piston"; U.S. Pat. No. 4,710,480, entitled "Method of Ceramic Molding Which Produces a Porosity Gradient and the Manufacture of Compound Moldings Using This Method"; U.S. Pat. No. 4,508,066, entitled "Ceramic Head for Internal Combustion Engine"; U.S. Pat. No. 4,341,826, entitled "Internal Combustion Engine and Composite Parts Formed from Silicon Carbide Fiber-Reinforced Ceramic or Glass Matrices"; U.S. Pat. No. 4,074,671, entitled "Thin and Low Specific Heat Ceramic Coating and Method for Increasing Operating Efficiency of Internal Combustion Engines"; U.S. Pat. No. 4,573,896, entitled "Apparatus for Selectively Manifolding Honeycomb Structures"; and U.S. Pat. No. 4,155,338, entitled "Valved Apparatus for Diverting an Exhaust Stream." Internal combustion engines are also shown in the Library of Congress catalogue card number 73-87772.

Some examples of rotary kilns in which the present invention may be applied may be of the type found in U.S. Pat. Nos. 3,753,682 and 3,182,980 and in a publication entitled "Ilmenite Direct Reduction Project In Norway Using The GRATE-CAR Process" and published by Boliden Allis, Inc. or other rotary kilns used for other purposes. Combustion spaces for yet other applications may also have linings made according to the various embodiments of the invention.

These U.S. patents and the other above-cited publications are incorporated by reference as if included in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. An internal combustion apparatus comprising:
   a body;
   at least one combustion space being formed in said body;
   said at least one combustion space having a ceramic lining;
   said ceramic lining having an inner surface portion for being adjacent to the combustion in said at least one combustion space and an outer surface portion being disposed away from said at least one combustion space;
   structures disposed within said ceramic lining between said inner and outer surface portions for forming cavities in said ceramic lining;
   said cavities being completely or at least partially covered by said inner surface portion;
   said combustion chamber comprising means for receiving a mounting therein;
   a flexible mounting for being received by said means for mounting; and
   said flexible mounting also being for receiving and holding its corresponding lining.

2. The internal combustion apparatus according to claim 1, wherein at least said cavities are formed by supports disposed between said inner and outer surface portions and said supports form webs.

3. The internal combustion apparatus according to claim 1, including a partition being disposed in said cavities separating a space adjacent a corresponding inner surface portion from a space adjacent a corresponding outer surface portion.

4. The internal combustion apparatus according to claim 2, wherein said supports are aligned and disposed one from the other between the inner surface portion and the partition; and other of said supports are aligned and displaced one from the other between the outer surface portion and the partition.

5. The internal combustion apparatus according to claim 3, wherein said partition is disposed substantially equidistant from said inner surface portion and said outer surface portion.

6. The internal combustion apparatus according to claim 1, including a ceramic fiber material being disposed between at least one of said linings and its corresponding combustion chamber; and
   said ceramic fiber material having its corresponding lining embedded therein.

7. The internal combustion apparatus according to claim 1, wherein said inner surface portion has thermal expansion joints disposed therein.

8. The internal combustion apparatus according to claim 1, wherein said ceramic lining comprises ceramic tubes disposed one adjacent to the other to form said ceramic lining.

9. The internal combustion apparatus according to claim 8, including plates for being disposed on the side of said tubes for facing the combustion chamber.

10. The internal combustion apparatus according to claim 7, wherein said inner surface portion has thermal expansion joints disposed therein;
    said lining comprising ceramic tubes disposed one adjacent to the other to form said lining; and
    plates being disposed on the side of said tubes for facing the combustion chamber.

11. An internal combustion apparatus comprising:
    a body;
    at least one combustion space being formed in said body;
    said at least one combustion space having a ceramic lining;
    said ceramic lining having an inner surface portion for being adjacent to the combustion in said at least one combustion space and an outer surface portion being disposed away from said at least one combustion space;
    structures disposed within said ceramic lining between said inner and outer surface portions for forming cavities in said ceramic lining;
    said cavities being completely or at least partially covered by said inner surface portion;
    wherein at least a part of said inner surface portion forms a substantially gas-tight structure for sealing at least some of said cavities having portions facing said at least one combustion chamber;
    at least some said cavities are formed by supports disposed between said inner and outer surface portions, and said supports form webs;
    a partition being disposed in at least some of said cavities separating a space adjacent a corresponding inner surface portion from a space adjacent a corresponding outer surface portion;
    said at least some of said supports being aligned and disposed one from the other between the inner surface portion and the partition, and other of said supports being aligned and displaced one from the other between the outer surface portion and the partition;
    said lining comprising a sandwich of different ceramic materials;

a ceramic fiber material for being disposed between at least one of said linings and its corresponding combustion chamber;

said ceramic fiber material having its corresponding lining embedded therein;

a flexible mounting for being received by means for mounting; and said flexible mounting also being for receiving and holding its corresponding lining.

12. A ceramic lining arrangement for a combustion space comprising:

a ceramic lining;

said ceramic lining comprising an inner surface portion for being adjacent to the combustion in a combustion space and an outer surface portion being disposed away from the combustion space;

said ceramic lining comprising structures disposed within said ceramic lining between said inner and outer surface portions for forming cavities in said ceramic lining;

said cavities being at least partially covered by said inner surface portion;

means for receiving a mounting;

a flexible mounting for being received by said means for mounting; and said flexible mounting also being for receiving and holding its corresponding lining.

* * * * *